(12) United States Patent
Brooks et al.

(10) Patent No.: US 8,265,236 B2
(45) Date of Patent: Sep. 11, 2012

(54) DEFINING THIRD-PARTY VOICE MAIL ACCESS NUMBERS IN VIEW OF LATA BOUNDARIES

(75) Inventors: Euclid S. Brooks, Laurel, MD (US); Michelle M. Johnston, Rockville, MD (US); Kenneth E. Letellier, Montclair, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1231 days.

(21) Appl. No.: 12/040,608

(22) Filed: Feb. 29, 2008

(65) Prior Publication Data

US 2009/0220059 A1   Sep. 3, 2009

(51) Int. Cl.
*H04M 1/64* (2006.01)
*H04L 12/28* (2006.01)

(52) U.S. Cl. ............... 379/88.17; 370/352; 370/395.1; 370/410; 379/67.1; 379/88.07; 379/88.18

(58) Field of Classification Search ............ 370/352, 370/395.1, 410; 379/67.1, 88.07, 88.17, 379/88.18
See application file for complete search history.

(56) References Cited

U.S. PATENT DOCUMENTS

| | | | | |
|---|---|---|---|---|
| 5,652,785 | A * | 7/1997 | Richardson et al. | 379/88.07 |
| 5,661,782 | A * | 8/1997 | Bartholomew et al. | 379/88.18 |
| 5,812,639 | A * | 9/1998 | Bartholomew et al. | 370/352 |
| 6,882,708 | B1 * | 4/2005 | Bedingfield et al. | 379/88.18 |
| 7,184,439 | B1 * | 2/2007 | Aubuchon et al. | 370/395.1 |
| 7,376,139 | B1 * | 5/2008 | McDonald et al. | 370/410 |
| 2007/0274470 | A1 * | 11/2007 | Crockett et al. | 379/67.1 |
| 2009/0220059 | A1 * | 9/2009 | Brooks et al. | 379/88.17 |

* cited by examiner

*Primary Examiner* — Gerald Gauthier (57) ABSTRACT

A method may include selecting a voice mail out-dial access number corresponding to a local access transport area (LATA) boundary, storing the voice mail out-dial access number on a voice mail system, and providing, by the voice mail system, voice mail out-dial service based on the LATA boundary associated with the voice mail out-dial access number. A method for providing toll-free access to the voice mail system that may be used by customers from both on-network and off-network end points.

21 Claims, 9 Drawing Sheets

DEFINING THIRD-PARTY VOICE MAIL ACCESS NUMBERS IN VIEW OF LATA BOUNDARIES

BACKGROUND

A service provider may offer a number of enhanced features with a voice mail system, such as electronic mail (e-mail) forwarding, providing a Web-based interface, allowing a subscriber to create private and shared distribution lists, etc. In some instances, a voice mail system may include an out-dial service to send a notification (e.g., a wake-up call, a reminder, or a message waiting notification) to a subscriber's cell phone, pager, and/or some other communication device. However, in instances when the voice mail system does out-dial to, for example, a switch, to complete the out-dial call, Local Access Transport Area (LATA) boundaries may not be taken into account. Additionally, the voice mail system may not include configuration information to adequately perform an off-network out-dial so that the out-dial routes to the correct switch.

Conversely, a subscriber may have to dial different telephone numbers to access his/her voice mail box, depending on whether the call is an on-network call or an off-network call, which, among other things, may be confusing to the subscriber.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Implementations described herein may provide a system having components to allow for out-dials from a voice mail system to be routed based on LATA boundaries. The term "component," as used herein, is intended to be broadly interpreted to include software, hardware, or a combination of hardware and software. Additionally, although the Session Initiation Protocol (SIP) may be mentioned in reference to an implementation associated with the concepts described herein, other Internet Protocol (IP) signaling protocols may be employed (e.g., H.323, Media Gateway Control Protocol (MGCP), and/or Megaco/H.248). Additionally, or alternatively, non-IP based protocols may be employed for signaling or content delivery. Accordingly, the concepts described herein are not dependent on employing a particular protocol.

Figure 1:
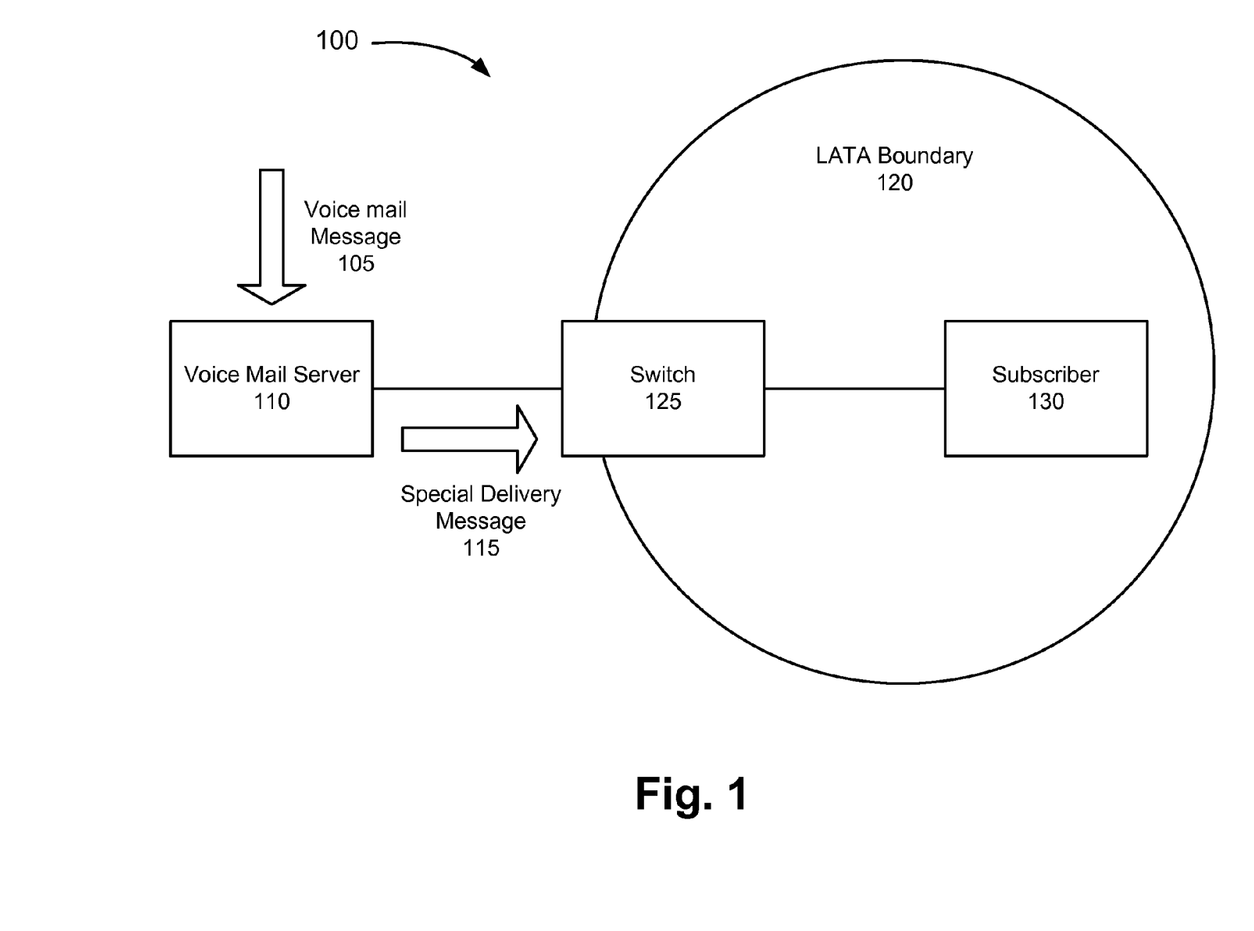
FIG. 1 is a diagram illustrating concepts described herein.

FIG. 1 is a diagram illustrating concepts described herein. As illustrated, an exemplary environment 100 may include a voice mail server 110, a LATA boundary 120 that includes a switch 125 and a subscriber 130. Voice mail server 110 may provide out-dial service to a subscriber 130.

For purposes of discussion, assume that voice mail server 110 receives a voice mail message 105. Given that voice mail server 110 provides out-dial service, voice mail server 110 may notify subscriber 130 that voice mail message 105 was received. For example, in such an instance, voice mail server 110 may issue a special delivery message 115 to notify subscriber 130 of voice mail message 105.

In one implementation, voice mail server 110 may include an out-dial access number and subscriber 130's telephone number (e.g., a home telephone number or a cell phone number). Voice mail server 110 may include the out-dial access number and subscriber 130's telephone number in special delivery message 115. That is, special delivery message 115 may include the out-dial access number to route special delivery message 115 to switch 125 of LATA boundary 120, and switch 125 may route special delivery message 115 to subscriber 130 based on subscriber 130's telephone number. Thus, voice mail server 110 may route special delivery message 115 while taking into consideration LATA boundaries, such as LATA boundary 120.

As a result of the foregoing, a voice mail system may provide services that comply with LATA boundaries. Since environment 100 has been partially described, variations to the above will be discussed further below. Additionally, the messages described above are merely exemplary.

Figure 2:
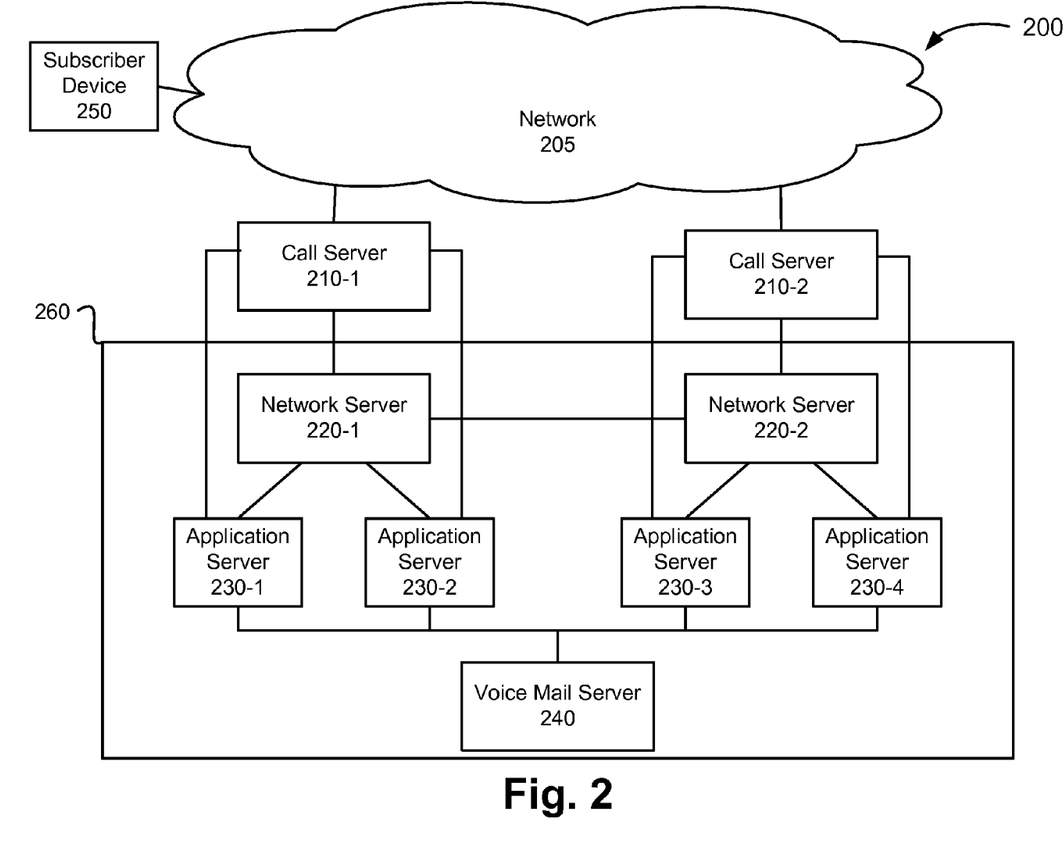
FIG. 2 is a diagram illustrating an exemplary environment in which systems and methods described herein may be implemented.

FIG. 2 is a diagram illustrating an exemplary environment 200 in which systems and methods described herein may be implemented. Environment 200 may include a network 205, call servers (CSs) 210-1 and 210-2 (referred to collectively, and in some instances individually, as CS 210), network servers (NSs) 220-1 and 220-2 (referred to collectively, and in some instances individually, as NS 220. application servers (ASs) 230-1, 230-2, 230-3, and 230-4 (referred to collectively, and in some instances individually, as AS 230), a voice mail server 240, and a subscriber device 250. NS 220, AS 230, and voice mail server 240 may be devices in an Internet Protocol (IP) network. For purposes of discussion, NS 220, AS 230, and voice mail server 240 may referred to collectively as a voice mail system 260.

Network 205 may be, for example, a Public Switched Telephone Network (PSTN). Additionally, or alternatively, network 205 may include another type of network, or a combination of networks.

CS 210 may include a gateway device. For example, CS 210 may operate as a bridge between network 205 and an Internet Protocol (IP) network (i.e., NS 220, AS 230, and voice mail server 240). In such an implementation, CS 210 may convert calls (e.g., voice and data) and call signals between Voice over IP (VoIP) and PSTN formats. CS 210 may include a softswitch. CS 210 may connect to network 205 and one or more devices in environment 200, such as NS 220 and AS 230.

NS 220 may include a device having network level applications, such as least-cost routing and Emergency 911 support, as well as enterprise-focused network applications, such as Voice Virtual Private Network (VPN) and web-configurable private dial plans. NS 220 may also provide redirect services to AS 230 and/or CS 210. NS 220 may connect to one or more devices in environment 200, such as CS 210 and AS 230. In one implementation, all of NS 220s may be included in a cluster with a common database. Additionally, or alternatively, all of the CS 210s and/or all of the AS 230s may communicate with all of the NS 220s. In other implementations, this may not be the case.

AS 230 may include a device that maintains subscriber and group profiles and service and subscription data. AS 230 may also provide network traffic and handling of signaling interfaces. AS 230 may include one or more databases as will be described further in reference FIG. 4. AS 230 may provide authentication services. AS 230 may connect to one or more devices in environment 200, such as NS 220 and voice mail server 240.

Voice mail server 240 may include a device that provides voice mail services including, among other services, out-dial services on and/or off-network. Voice mail server 240 may store an out-dial access number and a subscriber telephone number for providing out-dial services. Voice mail server 240 may connect to one or more devices in environment 200, such as AS 230.

Subscriber device 250 may include a device having communication capability. For example, subscriber device 250 may include a PSTN telephone, a mobile device, a pager, a computer, or a soft client. Subscriber device 250 may connect to one or more devices of network 205.

Although, FIG. 2 illustrates exemplary environment 200, in other implementations, environment 200 may include fewer, additional, and/or different devices than depicted in FIG. 2. For example, one or more devices in environment 200 may be connected to other devices not illustrated (e.g., a router, class 4/5 switches, a Private Branch Exchange (PBX), etc.). Additionally, or alternatively, environment 200 may not include NS 220 and/or AS 230. Additionally, or alternatively, devices may be combined into a single device. For example, voice mail server 240 of voice mail system 260 may be combined with AS 230 and/or NS 220. Additionally, or alternatively, a device may be implemented as two or more devices. Additionally, or alternatively, the connections between devices may be direct or indirect. Further, the connections may be, for example, wired or wireless.

Figure 3:
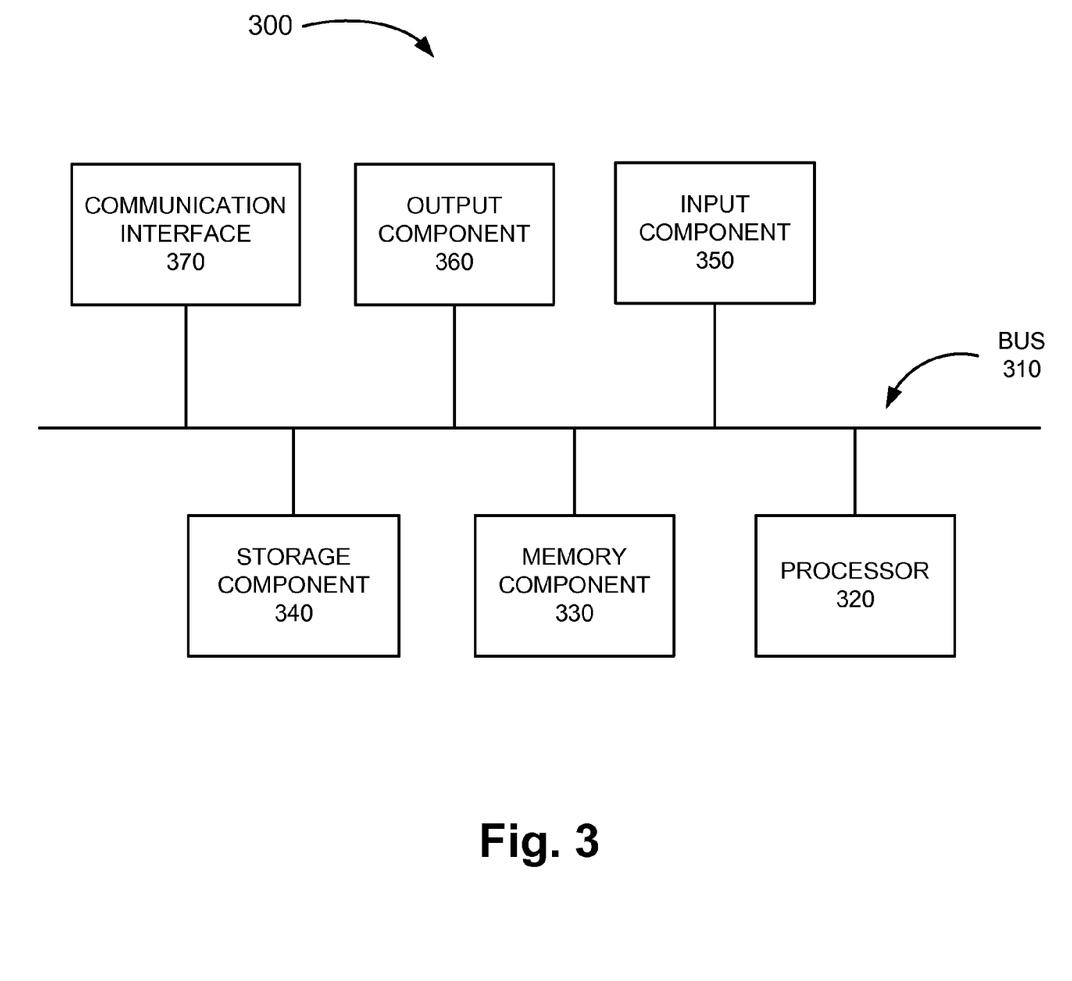
FIG. 3 is a diagram illustrating exemplary components that may correspond to one or more of the devices of the exemplary environment depicted in FIG. 2.

FIG. 3 is a diagram illustrating exemplary components of a device 300 that may correspond to one or more of the devices depicted in FIG. 2. For example, device 300 may correspond to CS 210, NS 220, AS 230, voice mail server 240, and/or subscriber device 250. As illustrated, device 300 may include a bus 310, a processor 320, a memory component 330, a storage component 340, an input component 350, an output component 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or processing logic that may interpret and execute instructions. "Processing logic," as used herein, may include hardware, software, or a combination of hardware and software.

Memory component 330 may include any type of component that stores data and instructions related to the operation and use of device 300. For example, memory component 330 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage component 340 may include a storing component, such as a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive.

Memory component 330 and/or storage component 340 may also include a storing component external to and/or removable from device 300, such as a Universal Serial Bus (USB) memory stick, a hard disk, etc.

Input component 350 may include a mechanism that permits a user to input information to device 300, such as a keyboard, a keypad, a mouse, a button, a switch, voice recognition logic, etc. Output component 360 may include a mechanism that outputs information to a user, such as a display, a speaker, one or more light emitting diodes (LEDs), etc.

Communication interface 370 may include any transceiver-like mechanism that enables device 300 to communicate with other devices and/or systems. For example, communication interface 370 may include an Ethernet interface, an optical interface, a coaxial interface, a radio interface, or the like. Communication interface 370 may allow for wired or wireless communication.

Communication interface 370 may implement industry promulgated protocol standards, such as transmission control protocol/Internet protocol (TCP/IP), Asynchronous Transport Mode (ATM), digital subscriber line (DSL), integrated services digital network (ISDN), fiber channel, synchronous optical network (SONET), Institute of Electrical and Electronic Engineers (IEEE) 802 standards, etc. Additionally, or alternatively, communication interface 370 may implement non-standard, proprietary, and/or customized interface protocols. Communication interface 370 may contain a plurality of communication interfaces to handle multiple traffic flows.

As will be described in detail below, device 300 may perform certain operations relating to the system and services described herein. Device 300 may perform these operations in response to processor 320 executing software instructions contained in a computer-readable medium, such as memory component 330. A computer-readable medium may be defined as a physical or a logical memory device.

The software instructions may be read into memory component 330 from another computer-readable medium or from another device via communication interface 370. The software instructions contained in memory component 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, different components than those depicted in FIG. 3. Additionally, or alternatively, in other implementations, one or more components may be arranged differently. Additionally, or alternatively, in still other implementations, one or more components of device 300 may perform one or more other tasks described as being performed by one or more other components of device 300.

Figure 4:
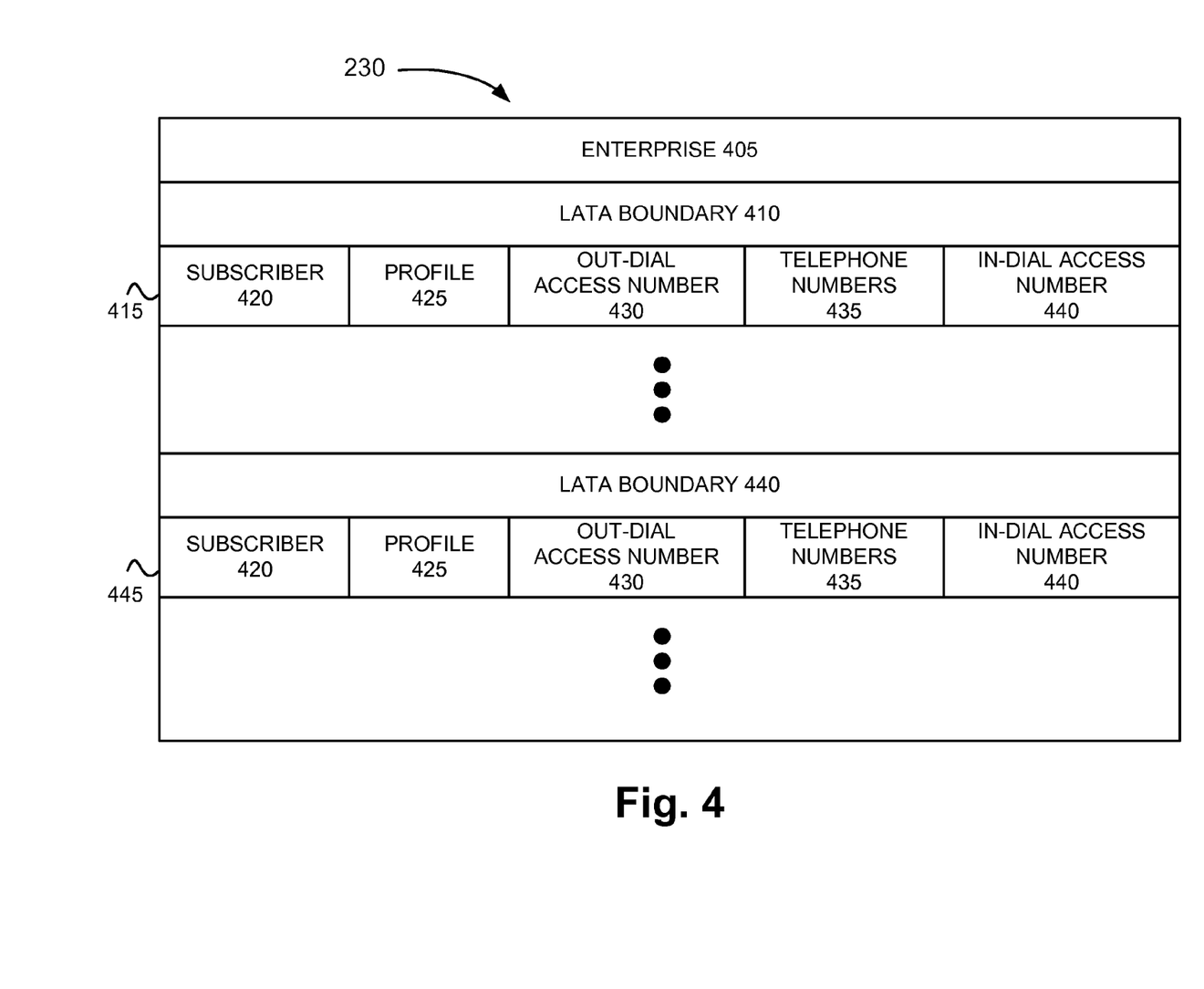
FIG. 4 is a diagram illustrating exemplary data that may be associated one or more devices of the exemplary environment depicted in FIG. 2.

FIG. 4 is a diagram illustrating exemplary data that may be associated with one or more devices of environment 200. That is, any device of environment 200 may include all or a portion of the data described below. For purposes of discussion, however, the data will be described in reference to AS 230. For example, AS 230 may store data associated with a company, such as an enterprise 405. Enterprise 405 may be divided in groups based on respective LATA boundaries. For example, enterprise 405 may be divided into a LATA boundary 410 and a LATA boundary 440. Each LATA boundary may include one or more records. For example, LATA boundary 410 may include records 415 and LATA boundary 440 may include records 445.

Records 415 and 445 may each include a number of data fields, such as a subscriber field 420, a profile field 425, an out-dial access number field 430, telephone numbers field 435, and an in-dial access number field 440.

Subscriber field 420 may include the name of a subscriber and/or some other type of identifier that uniquely identifies a subscriber (e.g., a character string). Profile field 425 may include the type of telephone service associated with a subscriber (e.g., local service, long distance service, international service, voice mail service, etc.). Out-dial access number field 430 may include an out-dial telephone number utilized for out-dial services. Telephone numbers field 435 may include one or more telephone numbers associated with a subscriber (e.g., a home telephone number, a mobile phone number, a work telephone number, etc.). One or more telephone numbers in telephone numbers field 435 may be employed as a subscriber contact number for purposes of out-dial services.

In-dial access number field 440 may include an in-dial access telephone number to allow a subscriber to access voice mail services. The in-dial access telephone number may include, for example, a ten digit telephone number. The in-dial access telephone number may correspond to a toll-free telephone number (e.g., 800, 866, 877, 888 and/or some other custom or vanity telephone number). Additionally, or alternatively, the in-dial access telephone number may correspond to a non-toll-free telephone number. In instances when there exists two in-dial access telephone numbers, one of the telephone numbers may be considered a primary in-dial access telephone number and the other telephone number may be considered a secondary or alternate in-dial access telephone number.

Although, FIG. 4 illustrates exemplary data associated with AS 230, in other implementations, AS 230 may include fewer, additional, and/or different data than the data depicted in FIG. 4. For example, the data may not relate to a business entity. Rather, the data may relate to residential subscribers. Additionally, or alternatively, voice mail server 240 and/or other devices in environment 200 may include data corresponding to that described as being stored on AS 230.

Figure 5:
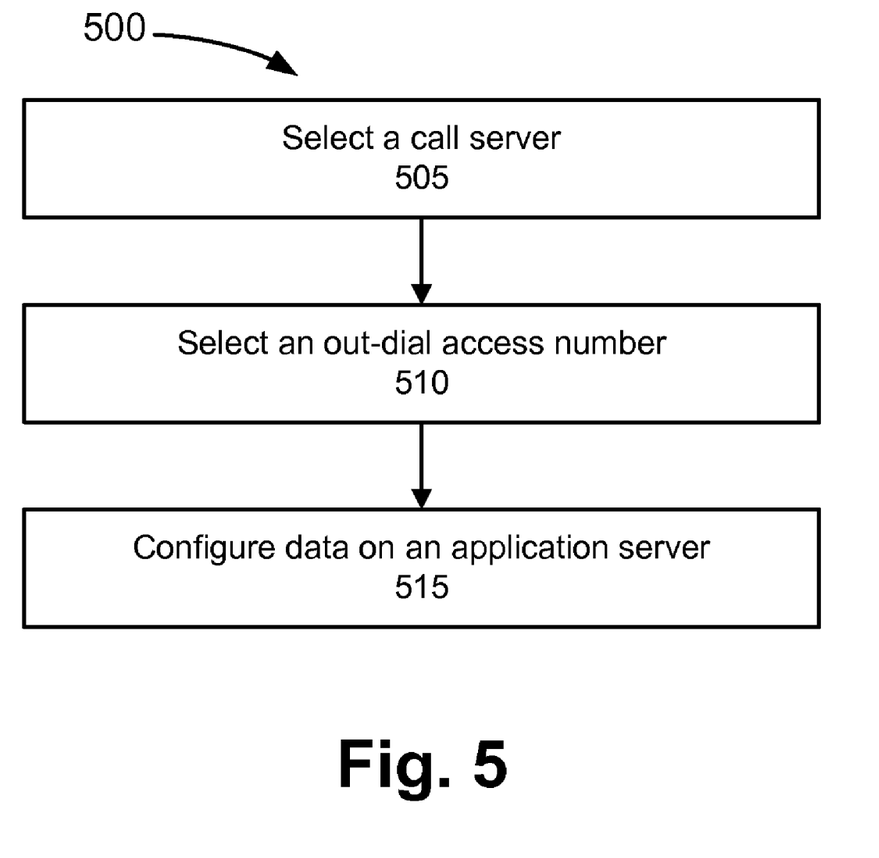
FIGS. 5-9 are flow diagrams illustrating exemplary processes associated with the concepts described herein.

FIG. 5 is a flow diagram illustrating an exemplary process 500 for configuring one or more devices of environment 200. In addition to FIG. 5, process 500 will be described in reference to exemplary environment 200 illustrated in FIG. 2 and the data illustrated in FIG. 4. Process 500 may be employed to assign an out-dial access number to a subscriber.

Process 500 may begin with selecting a call server (CS) (block 505). Depending on the network topology, one or more CSs may exist in a LATA boundary of a voice mail system. For example, in environment 200, CS 210-1 or CS 210-2 may be selected to route out-dial services. In one implementation, in instances where two or more CSs exist in a LATA boundary, selection may be based on shortest path criteria in view of a subscriber's contact telephone number associated with voice mail out-dial service. In other implementations, different criteria may be employed for selecting a CS.

An out-dial access number may be selected (block 510). For example, an out-dial access number may be imported out of CS 210, such as CS 210-1 or CS 210-2. Each CS may have a unique out-dial access number.

Data may be configured on an application server (AS) (block 515). For example, an out-dial access number may be stored in out-dial access number field 430 of AS 230. In one implementation, as previously described in connection to FIG. 4, enterprise 405 may be grouped based on LATA boundaries. Subscribers of a LATA boundary may be assigned an out-dial access number.

Although FIG. 5 illustrates an exemplary process 500, in other implementations, fewer, additional, or different processes may be performed. For example, as previously described, data may be configured on one or more devices of environment 200. Accordingly, process 500 may or may not involve configuring data on AS 230.

Figure 6:
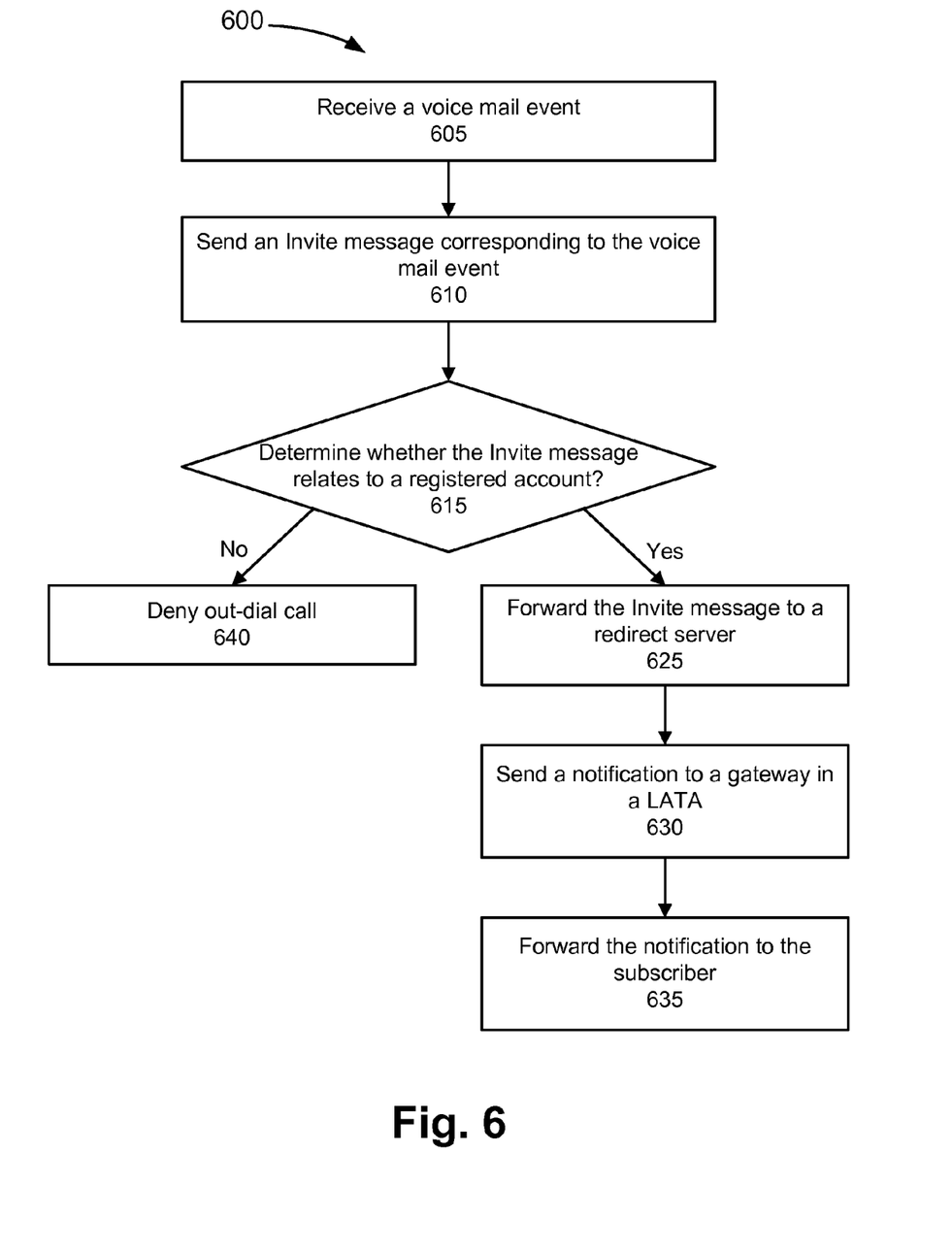

FIG. 6 is a flow diagram illustrating an exemplary process 600 for handling an off-network, out-dial notification. Process 600 may begin with voice mail server 240 receiving a voice mail event (block 605). A voice mail event could be any event which may trigger voice mail server 240 to notify a subscriber of an occurrence of the voice mail event. For example, a voice mail event may be voice mail server 240 receiving a voice mail message, a reminder to a subscriber to do something, etc.

An Invite message corresponding to the voice mail event may be sent (block 610). For example, based on the occurrence of the voice mail event, voice mail server 240 may generate and send a SIP INVITE message to AS 230, such as AS 230-1. The SIP INVITE message may include, for example, an out-dial access number and a subscriber contact telephone number.

It may be determined whether the Invite message relates to a registered account (block 615). For example, AS 230-1 may challenge the SIP INVITE message by issuing a 4xx—client unauthorized response (e.g., a 401 SIP message) back to voice mail server 240. In response, voice mail server 240 may issue a 2xx—successful response (e.g., a 200 SIP message, such as an acknowledgement). Additionally, or alternatively, voice mail server 240 may resubmit the SIP INVITE message with an authorization header containing digest credentials. For example, the digest credentials may include name and password information. AS 230-1 may determine whether the digest credentials correspond to a registered account based on, for example, information stored in subscriber field 420.

If AS 230-1 determines that the Invite message corresponds to a registered account (i.e., an account associated with an out-dial access number, such as out-dial access number 430) (block 615—Yes), then AS 230-1 may forward the SIP INVITE message to a redirect server (block 625). For example, AS 230-1 may forward the SIP INVITE message to a NS 220, such as NS 220-1. The SIP INVITE message may include an out-dial access number of out-dial access number field 430 and a subscriber contact telephone number of telephone numbers field 435. NS 220-1 may identify CS 210, such as CS 210-1, based on the SIP INVITE message, to route the notification to the subscriber. NS 220-1 then may issue a 3xx—redirection response (e.g., a 302 SIP message) containing routing instructions to AS 230-1. For example, the routing instructions may include an IP address of CS 210-1. AS 230-1 may respond with a 2xx—successful response (e.g., a 200 SIP message, such as an acknowledgement).

A notification to a gateway of a LATA boundary may be sent (block 630). For example, AS 230-1 may send the SIP INVITE message to CS 210-1.

The notification to the subscriber may be forwarded (block 635). For example, CS 210-1 may receive the SIP INVITE message and perform one or more translations for forwarding the notification in network 205 (e.g., the PSTN). For example, CS 210-1 may forward a voice mail out-dial message to a subscriber, such as subscriber 250, based on a subscriber contact telephone number of telephone number field 435 via network 205. The voice mail out-dial message may be routed to subscriber 250 in a manner that takes into account LATA boundaries.

If AS 230-1 determines that the Invite message does not correspond to a registered account (block 615—No), then AS 230-1 may deny the out-dial call (block 640). For example, if the SIP INVITE message from voice mail server 240 does not include digest credentials that correspond to data stored on AS 230-1, then AS 230-1 may issue a 4xx—client failure response (e.g., a 401 SIP message, such as an unauthorized user response) back to voice mail server 240. In such an instance, out-dial services may not be performed.

Although FIG. 6 illustrates an exemplary process 600, in other implementations, fewer, additional, or different processes may be performed.

Figure 7:
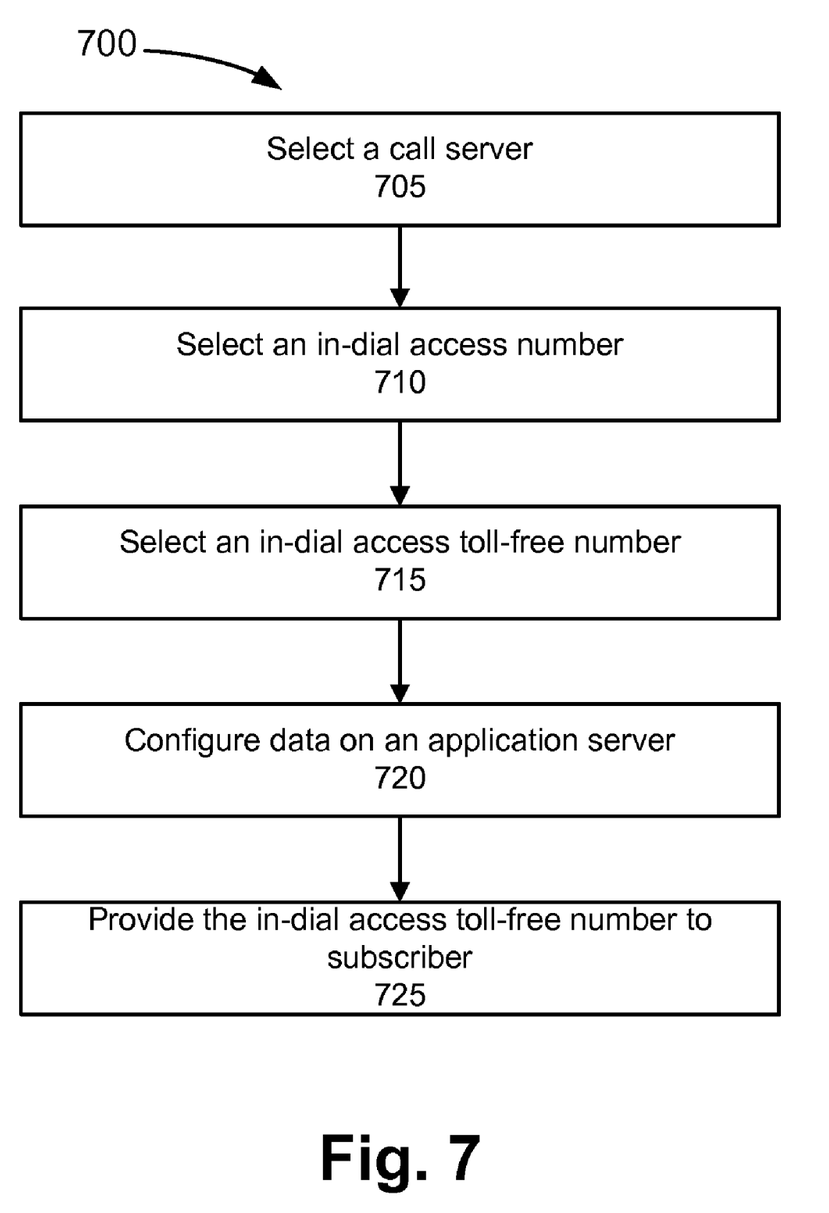

FIG. 7 is a flow diagram illustrating an exemplary process 700 for configuring one or more devices of environment 200. In addition to FIG. 7, process 700 will be described in reference to exemplary environment 200 illustrated in FIG. 2 and the data illustrated in FIG. 4.

Process 700 may begin with selecting a call server (CS) (block 705). Depending on the network topology, one or more CSs may exist in a LATA boundary of a voice mail system. For example, in environment 200, CS 210-1 or CS 210-2 may be selected to route in-dial services.

An in-dial access number may be selected (block 710). For example, an in-dial access number may be imported out of a CS, such as CS 210-1 or CS 210-2. In some instances, the in-dial access number may correspond to the out-dial access number previously described. Each CS may have a unique in-dial access number. In one implementation, in instances where two or more CSs exist in a LATA boundary, selection may be based on shortest path criteria in view of subscriber location (e.g., home telephone number, work telephone, etc.). In other implementations, different criteria may be employed for selecting a CS.

An in-dial access toll-free number may be selected (block 715). For example, a toll-free number (e.g., 800, 866, etc.) may be associated with the in-dial access number. For example, a voice mail service provider may select from a pool of tool-free numbers available to a subscriber.

Data may be configured on an application server (AS) (block 720). For example, the in-dial access toll-free number may be stored in in-dial access number field 440 of AS 230. In one implementation, as previously described in connection to FIG. 4, enterprise 405 may be grouped based on LATA boundaries. Subscribers of a LATA boundary may be assigned an in-dial access number. Additionally, or alternatively, subscribers, regardless of LATA boundary, may be assigned the same In-dial access number. Additionally, in one implementation, the in-dial access number imported from the CS may also be stored in in-dial access number field 440 of AS 230.

The in-dial access toll-free number may be provided to a subscriber (block 725). For example, the toll-free number may be provided to a subscriber so that he/she may access his/her voice mail box. In this way, if the subscriber should dial the in-dial access toll-free number from an off-network location, the call may route through the corresponding CS to reach voice mail server 240. On the other hand, if the subscriber should dial the in-dial access toll-free number from an on-network location, the call would remain within the network. Additionally, or alternatively, the in-dial access toll-free number may be employed for call forwarding (e.g., busy or ring-no-answer) to voice mail server 240. The in-dial access number may also be provided to a subscriber.

Although FIG. 7 illustrates an exemplary process 700, in other implementations, fewer, additional, or different processes may be performed. For example, voice mail server 240 and/or other devices in environment 200 may include data corresponding to that stored on AS 230. Additionally, or alternatively, operations 705 and/or 710 may be omitted if, for example, these steps were previously performed relating to selecting an out-dial access number.

Figure 8:
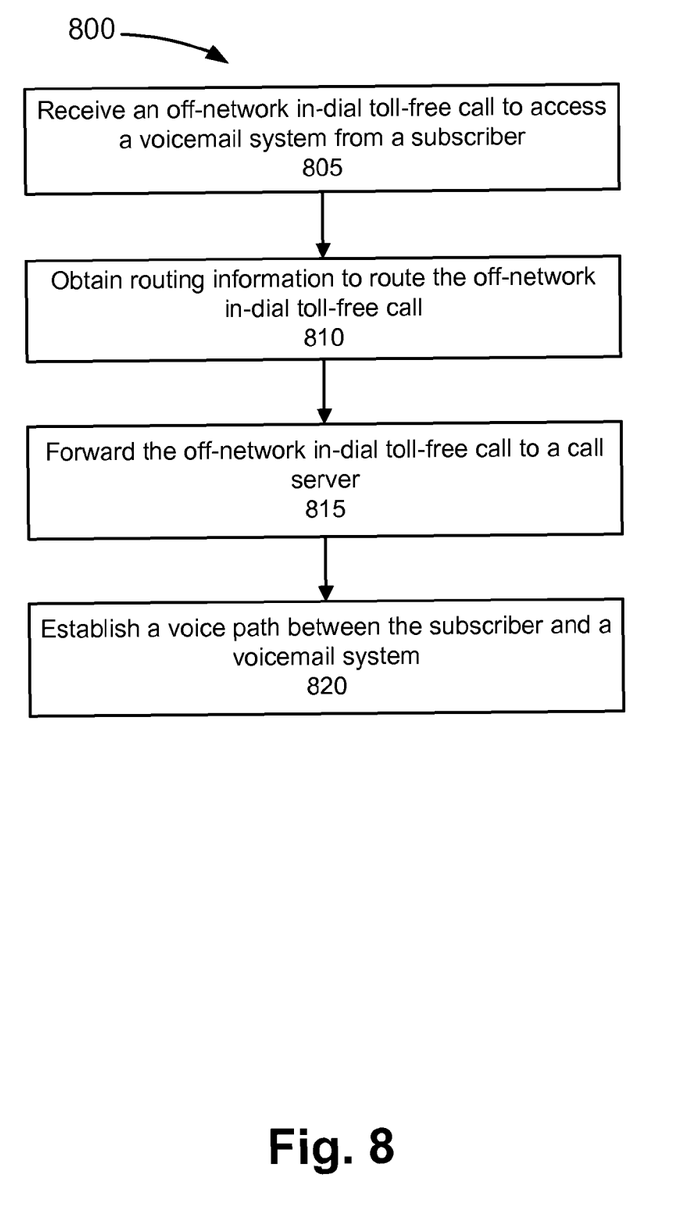

FIG. 8 is a flow diagram illustrating an exemplary process 800 for handling an off-network, in-dial toll-free number to access a voicemail system. In addition to FIG. 8, process 800 will be described in reference to exemplary environment 200 illustrated in FIG. 2 and the data illustrated in FIG. 4.

Process 800 may begin with receiving an off-network in-dial toll-free call to access voicemail system 260 from a subscriber (block 805). For example, the subscriber may dial an in-dial access telephone number. In one implementation, the in-dial access telephone number may correspond to a toll-free number (e.g., 800, 866, 877, 888, etc.) of in-dial access number field 440 associated with the subscriber. The subscriber may dial the in-dial access telephone number on subscriber device 250. A local switch in network 205 (not illustrated in FIG. 2) may receive the call. For purposes of discussion, the call may be considered an off-network call.

Routing information may be obtained to route the off-network in-dial toll-free call (block 810). For example, the local switch may communicate with a toll-free database (not illustrated in FIG. 2). The toll-free database may include information to route the toll-free call. For example, the toll-free database may provide the local switch with telephone number and carrier information so that the local switch may be able to forward the toll-free call.

The off-network in-dial toll-free call may be forwarded to a call server (block 815). For example, the local switch may direct the call to a particular CS 210, such as CS 210-1. The telephone number corresponding to the CS 210-1 may equate to the in-dial access telephone number corresponding to a non-toll-free telephone number. For example, if the telephone number is a local toll free number, the local switch query to the toll-free database may return a non-toll-free telephone number and the carrier. On the other hand, if the telephone number is a carrier/long distance owned toll-free number, the local switch query to the toll-free database may return a toll-free telephone number and the carrier, and then a carrier switch may query a carrier database for a non-toll-free telephone number which may be routed to CS 210-1.

A voice path may be established between the subscriber and voicemail system (block 820). For example, CS 210-1 may route the in-dial call. In one implementation, CS 210-1 may issue a SIP INVITE message to a NS 220, such as NS 220-1. NS 220-1 may respond with a SIP redirect message back to CS 210-1. The SIP redirect message may include an address (e.g., an IP address) of AS 230, such as AS 230-1. CS 210-1 may send a SIP INVITE message to AS 230-1. AS 230-1 may determine whether the SIP INVITE message relates to a registered account. In the instance that the SIP INVITE message does relate to a registered account, AS 230-1 may forward the SIP INVITE message to voice mail server 240. In this regard, a voice path may be established between the subscriber and voicemail system 260.

Although FIG. 8 illustrates an exemplary process 800, in other implementations, fewer, additional, or different processes may be performed. For example, voice mail server 240 and/or other devices in environment 200 may include data corresponding to that stored on AS 230. Additionally, or alternatively, for example, while it has been described that CS 210-1 may be selected to route the in-dial call, there may be multiple CS 210s to route the in-dial call. In one implementation, routing to multiple CS 210s may be based upon various metrics (e.g., a load allocation percentage).

Figure 9:
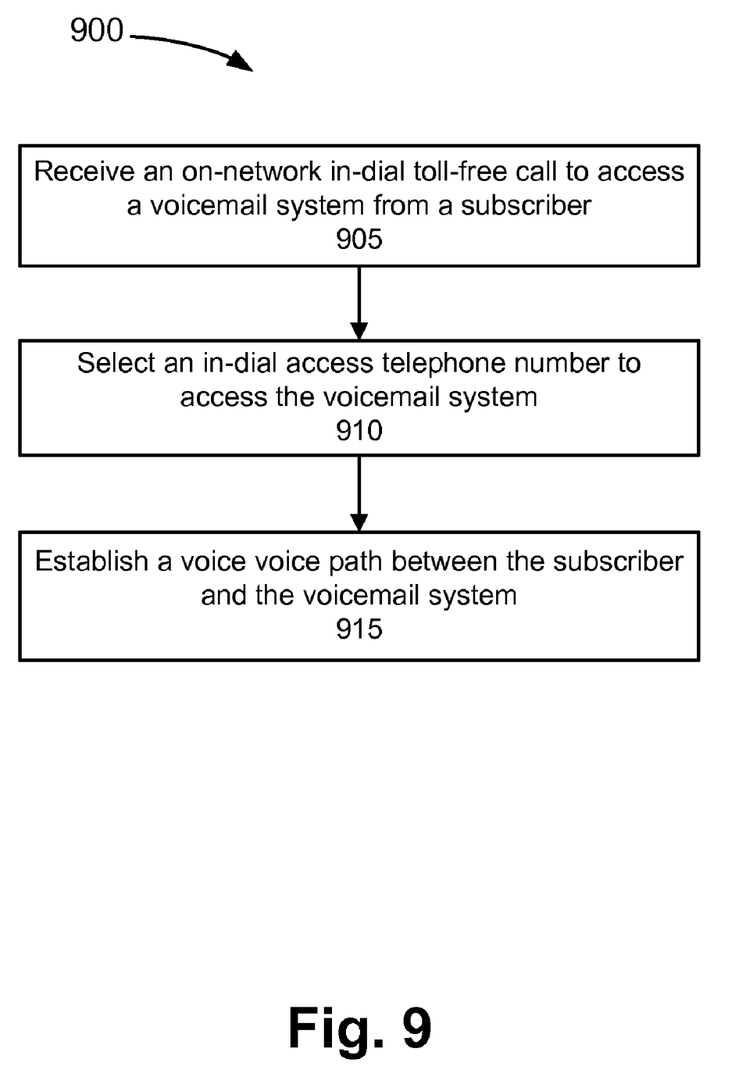

FIG. 9 is a flow diagram illustrating an exemplary process 900 for handling an on-network, in-dial toll-free number to access a voicemail system. In addition to FIG. 9, process 900 will be described in reference to exemplary environment 200 illustrated in FIG. 2 and the data illustrated in FIG. 4.

Process 900 may begin with receiving an on-network in-dial toll-free call to access voicemail system 260 from a subscriber (block 905). For example, the subscriber may dial an in-dial access telephone number. In one implementation, the in-dial access telephone number may correspond to a toll-free number (e.g., 800, 866, 877, 888, etc.) of in-dial access number field 440 associated with the subscriber. The subscriber may dial the in-dial access telephone number on subscriber device 250. For purposes of discussion, the call may be considered an on-network call. For example, when the subscriber dials the in-dial access telephone number, AS 230, such as AS 230-1 may receive a SIP INVITE message.

An in-dial access telephone number to access the voicemail system may be selected (block 910). For example, AS 230-1 may associate the toll-free in-dial access telephone number to in-dial access number field 440 associated with the subscriber. In this instance, AS 230-1 may replace the toll-free in-dial access telephone number with a non-toll-free in-dial access telephone number of in-dial access number field 440 associated with the subscriber.

A voice path may be established between the subscriber and voicemail system (block 915). For example, AS 230-1 may send the SIP INVITE message to a redirect server. For example, AS 230-1 may send the Invite message to NS 220, such as NS 220-1. NS 220-1 may respond with a SIP Redirect message to AS 230-1. AS 230-1 may send the SIP INVITE message to voice mail server 240. In this regard, a voice path may be established between the subscriber and voicemail system 260.

Although FIG. 9 illustrates an exemplary process 900, in other implementations, fewer, additional, or different processes may be performed. For example, voice mail server 240 and/or other devices in environment 200 may include data corresponding to that stored on AS 230.

As described in FIGS. 8 and 9, a subscriber may access his or her voice mailbox employing a toll free number regardless of whether the in-dial access call is an on-network call or an off-network call. Further, in the instance that a subscriber may access his or her voice mailbox by placing an on-network in-dial call, the on-network in-dial call may remain on-network without utilizing resources off network, for example, by directing the in-dial call off-network to perform various operations (e.g., look-ups, etc.). Thus, in one example, rather than performing an off-network look-up to determine a non-toll-free telephone number associated with the toll-free telephone number, these operations may remain on-network and performed by a device associated with the voicemail system, such as AS 230.

The foregoing description of implementations provides illustration, but is not intended to be exhaustive or to limit the implementations to the precise form disclosed. In this regard, the concepts described herein may have broader application. In addition, while series of blocks have been described with regard to the processes illustrated in FIGS. 5-9, the order of the blocks may be modified in other implementations. Further, non-dependent blocks may be performed in parallel.

It will be apparent that the exemplary model described herein may be implemented in many different forms of software, firmware, and hardware in the implementations illustrated in the figures. The actual software code or specialized control hardware used to implement the exemplary model does not limit the invention. Thus, the operation and behavior of the exemplary model were described without reference to the specific software code—it being understood that software and control hardware can be designed to implement the exemplary model based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
   selecting a voice mail out-dial access number corresponding to a local access transport area (LATA) boundary;
   storing the voice mail out-dial access number on a voice mail system; and
   providing, by the voice mail system, voice mail out-dial service based on the LATA boundary associated with the voice mail out-dial access number; recognizing a voice mail out-dial event by the voice mail system; creating a voice mail out-dial message including the voice mail out-dial access number; out-dialing by the voice mail system; and providing authentication services based on the voice mail out-dial message.

2. The method of claim 1, where the selecting comprises:
   importing the voice mail out-dial access number from a network device in the LATA boundary.

3. The method of claim 1, where the storing comprises:
   storing the voice mail out-dial access number based on a plurality of subscribers having a common LATA boundary.

4. The method of claim 1, further comprising:
   routing a voice mail out-dial message to a subscriber device based on one or more LATA boundaries.

5. The method of claim 1, further comprising:
   associating a voice mail in-dial access number corresponding to the LATA boundary, the voice mail in-dial access number being a toll-free number; and
   providing the voice mail in-dial access number to a subscriber.

6. The method of claim 5, further comprising:
   routing an off-network voice mail in-dial access request based on the LATA boundary.

7. The method of claim 5, further comprising:
   routing an on-network voice mail in-dial access request based on the toll-free number, where the on-network voice mail in-dial access request remains on-network to provide access to the voice mail system.

8. A computer-readable medium having stored thereon instructions, executable by at least one processor, the computer-readable medium comprising:

one or more instructions for recognizing a voice mail out-dial event;

one or more instructions for creating a voice mail out-dial message based on the voice mail out-dial event, the voice mail out-dial message including a voice mail out-dial access number, the voice mail out-dial message based on a local access transport area (LATA) boundary associated with a route for forwarding the voice mail out-dial message to a subscriber; and one or more instructions for forwarding the voice mail out-dial message to the subscriber based on the voice mail out-dial access number; and providing authentication services based on the mail out-dial message.

9. The computer-readable medium of claim 8, where the voice mail out-dial message includes a contact telephone number associated with the subscriber.

10. A computer-readable medium having stored thereon instructions, executable by at least one processor, the computer-readable medium comprising:

one or more instructions for providing authentication services;

one or more instructions for creating a voice mail out-dial message if the authentication services verify a subscriber account, the voice mail out-dial message including a voice mail out-dial access number associated with a route for forwarding the voice mail out-dial message to a subscriber according to one or more local access transport area (LATA) boundaries; and one or more instructions for forwarding the voice mail out-dial message to the subscriber based on the voice mail out-dial access number.

11. The computer-readable medium of claim 10, further comprising:

one or more instructions for managing a database including a plurality of subscriber accounts, where each subscriber of the plurality of subscriber accounts share a common LATA boundary of the one or more LATA boundaries.

12. The computer-readable medium of claim 11, where the database includes a voice mail in-dial access number for each subscriber, the voice mail in-dial access number being a toll-free number.

13. The computer-readable medium of claim 12, further comprising:

one or more instructions for forwarding a voice mail in-dial access message to a voice mail box based on the voice mail in-dial access number.

14. The computer-readable medium of claim 10, where the voice mail out-dial message is based on a Session Initiation Protocol (SIP).

15. The computer-readable medium of claim of claim 10, where the one or more instructions for forwarding comprise:

one or more instructions for forwarding the voice mail out-dial message to a network device corresponding to the voice mail out-dial access number.

16. A device, comprising:

a memory to store instructions; and a processor to execute the instructions to:

generate a voice mail out-dial access message, where the voice mail out-dial access message includes a voice mail out-dial access number associated with a local access transport area (LATA) boundary; and forward the voice mail out-dial access message to a subscriber via the LATA boundary based on the voice mail out-dial access number; perform authentication services based on receiving the voice mail out-dial access message; deny forwarding of the voice mail subscriber accounts based on an arrangement of subscribers having associated therewith the voice mail out-dial access number.

17. The device of claim 16, where the processor further executes instructions to:

manage a plurality of voice mail subscriber accounts based on an arrangement of subscribers having associated therewith the voice mail out-dial access number.

18. The device of claim 16, where the voice mail out-dial access message includes a subscriber contact telephone number.

19. The device of claim 16, where the processor further executes instructions to:

manage a plurality of voice mail subscriber accounts based on an arrangement of subscribers having associated therewith a voice mail in-dial access number, where the voice mail in-dial access number includes a toll-free telephone number.

20. A system comprising:

a voice mail device to:

provide out-dial services to a voice mail subscriber, store a voice mail out-dial access number, the voice mail out-dial access number corresponding to a local access transport area (LATA) boundary, and create a voice mail out-dial access message based on the voice mail out-dial access number, the voice mail out-dial access message routable to the voice mail subscriber according to the LATA boundary; provide authentication services based on receiving the voice mail out-dial access message; and store a plurality of voice mail subscriber accounts having identifiers for corresponding voice mail subscribers each associated with a common LATA boundary.

21. The system of claim 19, further comprising:

a server to:

provide authentication services based on receiving the voice mail out-dial access message, and store a plurality of voice mail subscriber accounts having identifiers for corresponding voice mail subscribers each associated with a common LATA boundary.

\* \* \* \* \*